United States Patent [19]

Sellet et al.

[11] 4,433,899
[45] Feb. 28, 1984

[54] REAR VIEW MIRROR FOR DROP TYPE BICYCLE HANDLE BARS

[76] Inventors: Frederick Sellet, 546 94th St., Brooklyn, N.Y. 11209; Guerino F. George, 7803 14th Ave., Brooklyn, N.Y. 11228; Thomas S. Abbondante, 1052 62nd St., Brooklyn, N.Y. 11219

[21] Appl. No.: 306,084

[22] Filed: Sep. 28, 1981

[51] Int. Cl.³ .............................................. G02B 7/18
[52] U.S. Cl. .................................. 350/307; 74/551.8; 248/479
[58] Field of Search .............. 350/307, 303, 304, 288, 350/298; 248/479, 476; 74/551.8

[56] References Cited

U.S. PATENT DOCUMENTS

| | | | |
|---|---|---|---|
| 516,910 | 3/1894 | Bucherer | 350/307 |
| 564,454 | 7/1896 | Ryan | 350/307 |
| 1,879,516 | 9/1932 | Rowan | 248/479 |
| 2,176,167 | 10/1939 | Comstock | 350/298 |
| 3,377,117 | 4/1968 | Biscow | 350/307 |
| 4,054,375 | 10/1977 | Ribeca | 350/307 |
| 4,188,093 | 2/1980 | Netzer | 350/307 |
| 4,380,369 | 4/1983 | Schacht | 350/307 |

FOREIGN PATENT DOCUMENTS 2254338  5/1974  Fed. Rep. of Germany ...... 350/307

*Primary Examiner*—Jon W. Henry
*Attorney, Agent, or Firm*—Richard L. Miller

[57] ABSTRACT

A rear view mirror assembly for drop type bicycle handle bars; including a mirror pivotable about a pin on a bracket affixed to a stem, which in one design of the invention is attached to a clip that slips on the bicycle brake control unit; the stem in another design of the invention being attached to a clamp bolt held on the handle bar; and the stem in still another design being affixed to a clip having a hook on its end so as to snap around the handle bar and clip to the brake control unit.

1 Claim, 7 Drawing Figures

U.S. Patent  Feb. 28, 1984  4,433,899
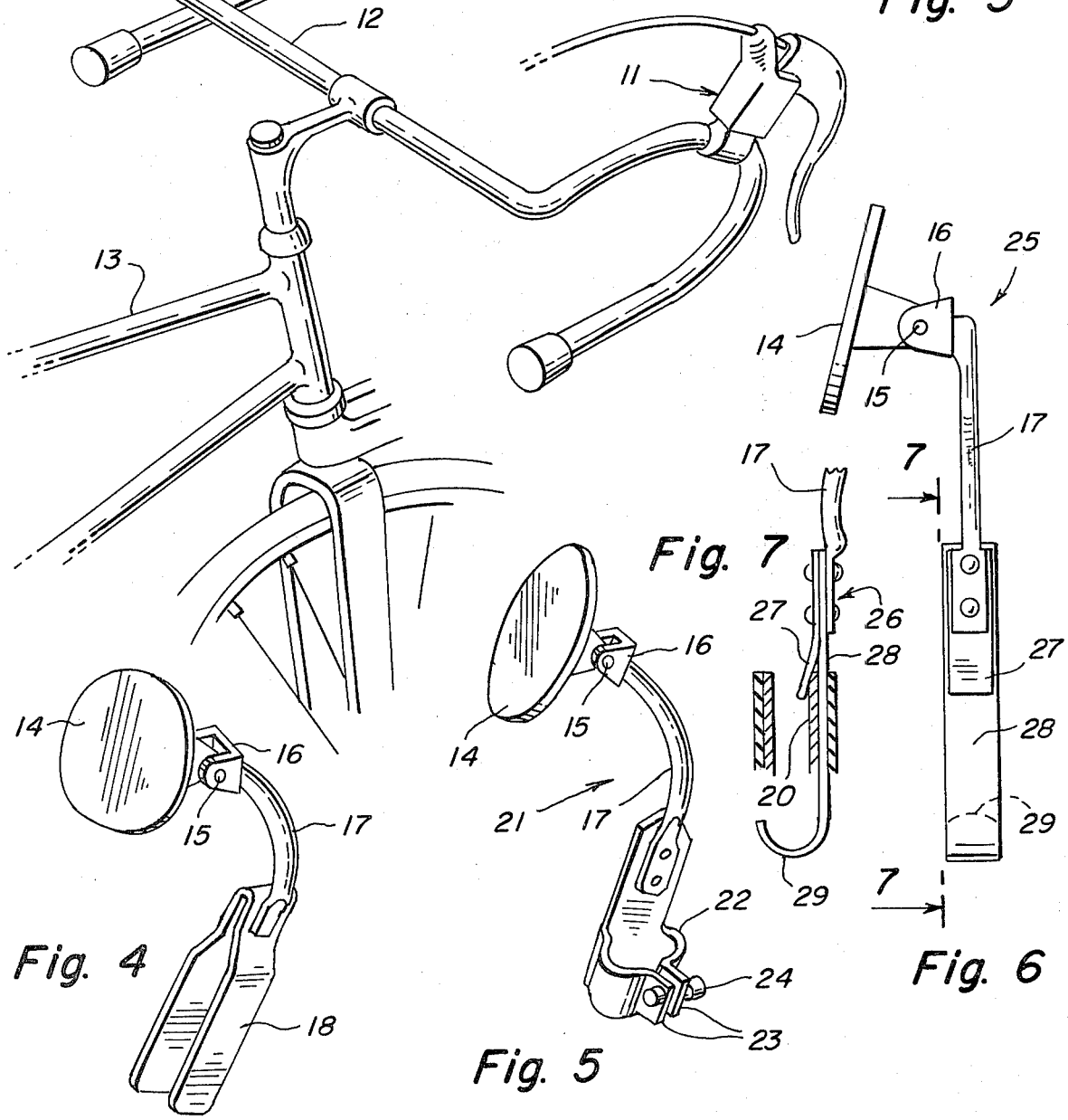

REAR VIEW MIRROR FOR DROP TYPE BICYCLE HANDLE BARS

This invention relates generally to rear view mirrors such as attachable to handle bars of bicycles.

BACKGROUND OF THE INVENTION

It is well known that numerous rear view mirrors have been designed in the past for attachment to handle bars of bicycles to touring type wherein the handle bars are upwardly rearwardly extended.

SUMMARY OF THE INVENTION

It is a principal object of the present invention to provide a rear view mirror that is designed particularly for drop type bicycle handle bars.

Another object is to provide a rear view mirror for drop type bicycle handle bars wherein the mirror is supported from the bicycle brake control unit that is conventionally mounted on the handle bar.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows:

FIG. 1 is a perspective view of one design of the invention shown mounted on a bicycle.

FIG. 2 is a side view detail showing how the device fits between a base of a brake control unit and a rubber boot fitted around the brake control unit base.

FIG. 3 is a cross sectional view on line 3—3 of FIG. 2.

FIG. 4 is a perspective view of the invention design shown in FIG. 1.

FIG. 5 is a perspective view of another design of the invention.

FIG. 6 is a side view of still another design of the invention.

FIG. 7 is a view in the direction 7—7 of FIG. 6 showing how the device is installed on the bicycle brake control unit.

DETAILED DESCRIPTION OF PREFERRED EMBODIMENT

Referring now to the drawing in greater detail, and more particularly to FIGS. 1 through 4 thereof, at this time, the reference numeral 10 represents a rear view mirror assembly according to the present invention, and which is designed for being slipped on the brake control unit 11 that is installed on a drop type handle bar 12 of a bicycle 13 such as is used for bicycle racing.

The rear view mirror assembly 10 includes a mirror 14 pivotally supported on a pin 15 of a bracket 16 at one end of a curved stem 17 which at the other end is affixed to a U-shaped clip 18 that is insertable between a resilient rubber boot 19 and a mechanism housing 20 of the brake control unit 11. Thus the rear view mirror assembly is securely mounted on either a left or right of the units 11, whichever is most advantageous to the bicyclist.

Referring now to FIG. 5, another design of rear view mirror assembly 21 is shown for being bolt secured to the bicycle drop type handle bar 12. In this design, the assembly 21 includes the above described mirror 14, the pin 15, the bracket 16 and curved stem 17. However the stem is riveted to clamp 22 which fits around the handle bar, and the opposite tongues 23 of the clamp are then drawn tightly around the handle bar by means of a boot 24 fitted through both of the tongues.

Referring now to FIGS. 6 and 7, still another design of rear view mirror assembly 25 is shown for being snap fitted to the brake control unit 11.

In this design, the stem 17 is riveted to a clip 26 formed of two flat spring steel strips 27 and 28, a first of which is short and the other of which is long so that an extending end formed a U-shaped hook 29.

The rear view mirror assembly 25 is installed on the bicycle by first inserting the hook and extending end of the strip 28 between the boot 19 and the mechanism housing 20 of the brake control unit 11.

The hook is hooked around an underside of the handle bar and the clip strip 27 is clipped around the upper edge of the mechanism housing 20, as shown in FIG. 7.

Thus three forms of the rear view mirror assembly are here presented.

While certain novel features of this invention have been shown and described and are pointed out in the annexed claims, it will be understood that various omissions, substitutions and changes in the forms and details of the device illustrated and in its operation can be made by those skilled in the art with out departing from the spirit of the invention.

We claim:

1. In combination, a hand brake and a rear view mirror for drop type bicycle bars, the hand brake being supported from the hand bar in upstanding orientation and comprising a resilient rubber boot surrounding an internal brake mechanism, said rear view mirror comprising a mirror pivoted on a pin supported in a bracket affixed to an arcuately curved stem, an inverted U-shaped clip member depending from and supporting the lower end of the stem and having a pair of spaced apart parallel bifurcated legs insertable into said hand brake to straddle the brake mechanism and be securely retained between said boot and brake mechanism, said mirror being pivotable between a forward and rearward facing direction, whereby said rear view mirror can be utilized on right or left hand brakes.

* * * * *